(No Model.)

J. H. FAY.
CAMERA TRIPOD HEAD.

No. 566,451. Patented Aug. 25, 1896.

Witnesses
H. van Oldenneel
E. A. Scott

Inventor
John Henry Fay.
by Richardson
Attorneys.

THE NORRIS PETERS CO., PHOTO-LITHO., WASHINGTON, D. C.

UNITED STATES PATENT OFFICE.

JOHN HENRY FAY, OF LONDON, ENGLAND.

CAMERA-TRIPOD HEAD.

SPECIFICATION forming part of Letters Patent No. 566,451, dated August 25, 1896.

Application filed May 29, 1896. Serial No. 593,605. (No model.)

*To all whom it may concern:*

Be it known that I, JOHN HENRY FAY, a citizen of the United States, and a resident of London, England, have invented certain new and useful Improvements in Mounting Photographic Cameras on their Tripods or Supports, of which the following is a specification.

The object of my invention is to provide very simple but highly efficient means for mounting photographic cameras on their tripods or other supporting appliances in such wise that these cameras can very easily and quickly be moved into any positions and be pointed in any directions and be trained on any objects or views wheresoever such objects or views may be. With this object I construct and fit a bracket to carry the camera in the following manner: The base of the bracket is pivoted and can be turned on the top or platform of the tripod or support. A standard is erected on the base and a plate is pivoted and can be moved or turned on the face of the standard. Parallel cheeks project from the plate, and a lug on the camera is pivoted and can be moved or turned between these cheeks. There are thus provided in this bracket three pivots, namely, a vertical pivot through the base and the top or platform of the tripod or support, a horizontal and longitudinal pivot through the plate and the standard, and a horizontal and transverse pivot through the cheeks and the lug on the camera. These three pivots will obviously allow the camera to be moved as desired, and clamping appliances are provided to retain the several parts in what relative positions are required.

Figure 1:
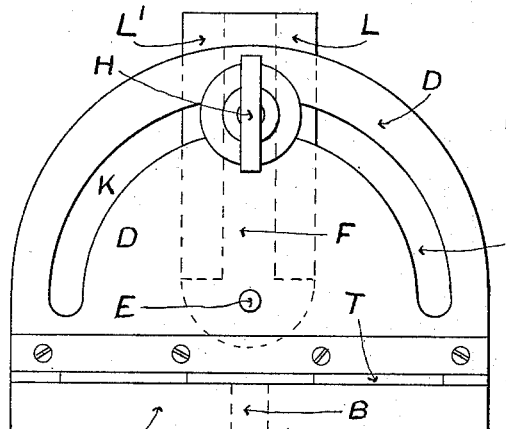
Figure 3:
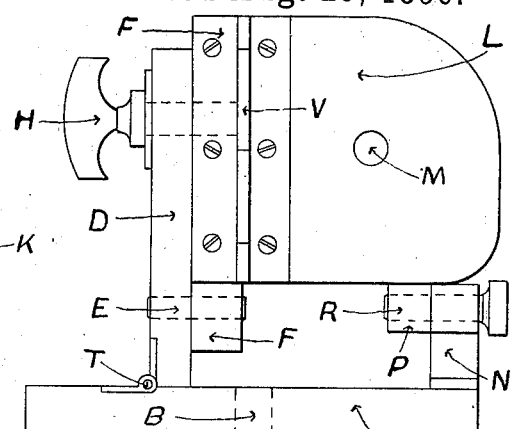
Figure 2:
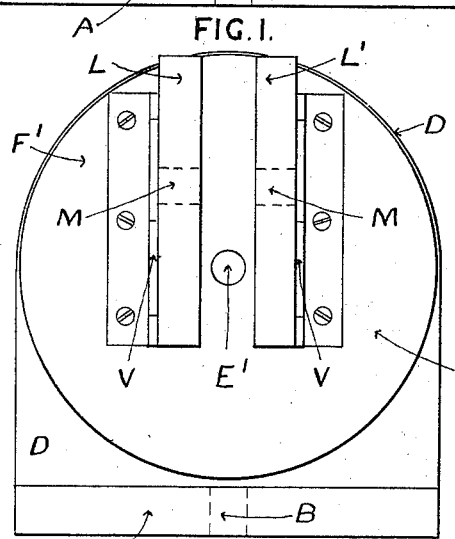
Figure 4:
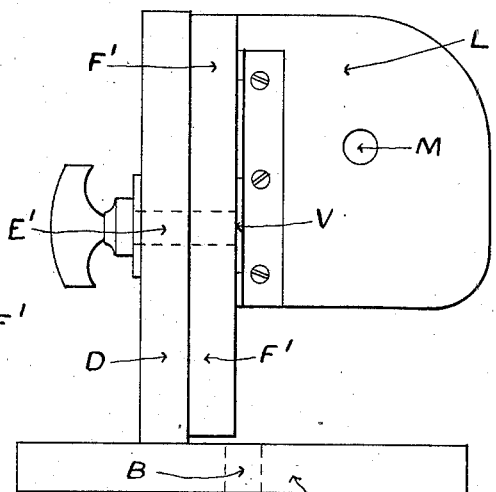
Figure 5:
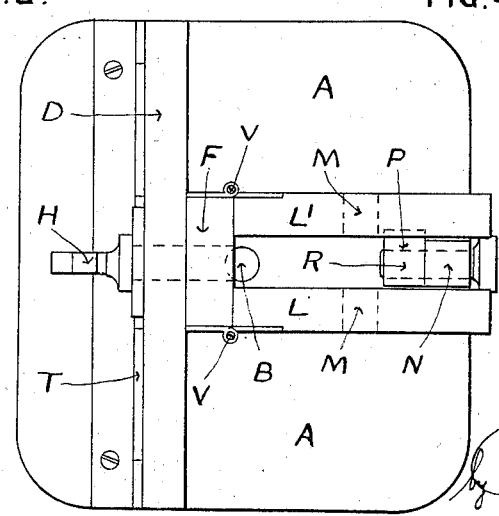

In the accompanying drawings, Figure 1 is a rear elevation of the bracket. Fig. 2 is a front elevation thereof. Figs. 3 and 4 are side elevations thereof, showing the horizontal and longitudinal pivot in two different positions; and Fig. 5 is a plan of the bracket.

A base A is made of a suitable size and shape, and centrally or thereabout therethrough is made a hole B. When this base A is placed on the top or platform of the tripod or support, a bolt can be passed through the hole B and through a corresponding hole in such top or platform to act as a pivot, on which pivot a winged nut or other ordinary device can be provided for clamping purposes, as is usual.

On the base A, and at or near one of the edges or ends thereof, is erected a standard D of a suitable height, breadth, and shape, preferably, perhaps, of a semicircular shape.

On and against the face of the standard D is placed a plate F, and according to one arrangement (shown in Figs. 1, 3, and 5) the pivot E thereof is low down on the standard D, being at or about the middle thereof. In this case the plate F is preferably small and narrow, and the pivot E is at or near one of its ends, and the other end of the plate F can be retained in any desired position whether vertically above the pivot E, as is shown in these figures, or inclined out of the vertical plane on either side by a clamping-bolt H, which passes through a semicircular slot K into this plate F. This semicircular slot K can be made in the standard D, as is shown in Fig. 1, or can be connected to such standard D or can be separately erected on the base A in any ordinary manner.

According to another arrangement (shown in Figs. 2 and 4) the pivot E' is raised up higher on the standard D, being at or about the center thereof. In this case the plate F' is enlarged, and can most conveniently be of a circular shape, the pivot E' being at the center thereof, and no separate clamping-bolt is required, but the pivot E' can itself be formed as a clamping-bolt, or can be provided with a winged nut or other ordinary device for clamping purposes, as is usual.

On the plate F or F' can be fitted two cheeks L and L', which project therefrom at right angles or thereabout, and are parallel with each other, being a certain small distance apart. When the plate F is vertical to the base A, these cheeks L and L' are also vertical, while on the plate F' these cheeks L and L' are arranged diametrically or in line therewith. Centrally or thereabout through these cheeks L and L' are made corresponding holes M.

A lug or the like of any style is formed with or attached to the camera in a suitable position, and can be inserted between the two cheeks L and L', a hole being made therein corresponding with the holes M. A bolt can then be passed through these corresponding holes to act as a pivot, on which pivot a winged nut or other ordinary device can be provided for clamping purposes, as is usual.

When the bracket is arranged as is shown in Figs. 1, 3, and 5, it may sometimes be convenient, for purposes of rigidity and the like, to support the free edges of the cheeks L and L'. With this object a bracket N can be properly erected on the base A, and a corresponding bracket P can depend from one or both of the cheeks L and L', and a screw or a spring or other pin R, which must obviously correspond in position with the pivot E, can be passed through both brackets N and P, whereby in this case the cheeks L and L' would be supported by and would be moved or turned on two pivots E and R. Again, when the bracket is arranged as is shown in Figs. 1, 3, and 5, the cheeks L and L', being, if necessary, enlarged therefor, can be hinged or pivoted directly on the base A along their under edges, in which case, as is obvious, the separate pivots E and R and the brackets N and P could be dispensed with; but the motion of the two cheeks L and L' on their continuous horizontal and longitudinal pivot would still be precisely the same.

The necessary parts of the bracket, that is to say, the base A and the standard D and the plate F or F' and the cheeks L and L', can be rigidly and undetachably secured together, say, for example, by screws or the like; or they can be rigidly and detachably secured together, say, for example, by sliding the one part on edge into a groove formed therefor in the other part or the like; or, as is perhaps preferable, the standard D may be connected to the base A by a hinge T, and the cheeks L and L' may be separably connected to the plate F or F' by outside hinges V. By this arrangement, as is obvious, the bracket can be folded down into a flat small compass for convenience of packing, carrying, and the like. This convenience could be still further enhanced by hinging the standard D on the extreme edge of the base A and forming and fitting these hinges, as is usual, to allow the standard D to be folded under and against the lower surface of the base A, wherein an aperture can be made to receive the handle of the clamping-bolt H or the handle or the winged nut or the like of the pivot E', which, having passed through this aperture, could be turned to lock the parts together, as is usual.

It may sometimes be advisable to transpose the parts and to place the two parallel cheeks on the camera and the lug on the pivoted plate of the bracket, and also even to provide only one cheek instead of the two cheeks aforesaid; but in both these cases the action and the motion on the horizontal and transverse pivot would still be precisely the same. This bracket and the several parts thereof can be made of any desired shapes and sizes and of any suitable material, preferably, perhaps, of wood, and the bolts and pivots, the clamping appliances, and the hinges, if any, can likewise be made and fitted in any usual manner suitable for allowing them to perform their necessary functions with ease, rapidity, and certitude.

Having now described my invention, what I claim as new, and desire to secure by Letters Patent, is—

1. In combination, a base A pivoted on the top or platform of a tripod or support, a standard D erected on the base A, a plate F pivoted at its lower end by a pivot E on the standard D and provided at its upper end with a clamping-bolt H traveling in a slot K, cheeks L and L' projecting from the plate F, and a lug on a camera pivoted between the cheeks L and L', substantially as described, for the purpose specified.

2. In combination, a base A pivoted on the top or platform of a tripod or support, a standard D erected on the base A, a plate F facing the standard D and provided at its upper end with a clamping-bolt H, cheeks L projecting from the plate F and pivoted along their under edges on the base A, and a lug on a camera pivoted on the cheeks L, substantially as described, for the purpose specified.

3. In combination, a base A pivoted on the top or platform of a tripod or support, a standard D erected on the base A, a plate F' centrally pivoted by a pivot E' on the standard D, cheeks L and L' projecting from the plate F', and a lug on a camera pivoted between the cheeks L and L', clamping appliances being fitted on all the pivots, substantially as described, for the purpose specified.

In witness whereof I have hereunto set my hand in presence of two witnesses.

JOHN HENRY FAY.

Witnesses:
   JAMES HART,
   FRED. JONES.